United States Patent
Bhosle et al.

(10) Patent No.: US 10,871,033 B2
(45) Date of Patent: Dec. 22, 2020

(54) STEERING ASSEMBLY POSITION SENSING USING RADIO FREQUENCY IDENTIFICATION

(71) Applicant: HALLIBURTON ENERGY SERVICES, INC., Houston, TX (US)

(72) Inventors: Gopal M. Bhosle, Wetaskiwin (CA); Geoffrey A. Samuel, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 68 days.

(21) Appl. No.: 15/528,465

(22) PCT Filed: Dec. 23, 2014

(86) PCT No.: PCT/US2014/072164
§ 371 (c)(1),
(2) Date: May 19, 2017

(87) PCT Pub. No.: WO2016/105387
PCT Pub. Date: Jun. 30, 2016

(65) Prior Publication Data
US 2017/0321485 A1   Nov. 9, 2017

(51) Int. Cl.
| | |
|---|---|
| *E21B 7/06* | (2006.01) |
| *G06K 7/10* | (2006.01) |
| *G06K 19/07* | (2006.01) |
| *E21B 47/13* | (2012.01) |
| *E21B 47/024* | (2006.01) |
| *E21B 47/18* | (2012.01) |

(52) U.S. Cl.
CPC .............. *E21B 7/06* (2013.01); *E21B 47/024* (2013.01); *E21B 47/13* (2020.05); *G06K 7/10009* (2013.01); *G06K 19/0723* (2013.01); *E21B 47/18* (2013.01)

(58) Field of Classification Search
CPC ................. E21B 7/00; E21B 7/06; E21B 7/04
See application file for complete search history.

(56) References Cited

U.S. PATENT DOCUMENTS

| | | | |
|---|---|---|---|
| 5,002,138 A | * | 3/1991 | Smet .......................... E21B 4/02 175/107 |
| 5,202,680 A | | 4/1993 | Savage |

(Continued)

OTHER PUBLICATIONS

PCT International Search Report and Written Opinion, dated Sep. 1, 2015, Appl No. PCT/US2014/072164, "Steering Assembly Position Sensing Using Radio Frequency Identification," Filed Dec. 23, 2014, 13 pgs.

*Primary Examiner* — David J Bagnell
*Assistant Examiner* — Dany E Akakpo
(74) *Attorney, Agent, or Firm* — Benjamin Ford; Parker Justiss, P.C.

(57) ABSTRACT

A downhole steering assembly includes a steering element having an adjustable azimuthal orientation relative to a tool body. The downhole tool further includes a radio frequency identification (RFID) reader to read RFID tags arranged in an azimuthal arrangement. The downhole tool further includes an actuation mechanism that brings different RFID tags into range of the RFID reader. The downhole tool further includes a processor coupled to the RFID reader to determine an azimuthal orientation of the steering element and to responsively control the actuation mechanism.

20 Claims, 2 Drawing Sheets

(56) References Cited

U.S. PATENT DOCUMENTS

| | | |
|---|---|---|
| 6,244,361 B1 | 6/2001 | Comeau et al. |
| 6,415,878 B1 | 7/2002 | Cargill et al. |
| 6,769,499 B2 | 8/2004 | Cargill et al. |
| 7,588,082 B2 | 9/2009 | Lasater |
| 7,786,864 B1 | 8/2010 | Shostak et al. |
| 7,814,988 B2 | 10/2010 | Andreas |
| 8,016,036 B2 | 9/2011 | Kirkwood et al. |
| 8,397,810 B2 | 3/2013 | Verret et al. |
| 8,662,182 B2 | 3/2014 | Redlinger et al. |
| 8,770,285 B2 | 7/2014 | McGregor |
| 8,794,354 B2 | 8/2014 | Xu et al. |
| 8,800,880 B2 | 8/2014 | Christiansen |
| 8,833,469 B2 | 9/2014 | Purkis |
| 2004/0020691 A1 | 2/2004 | Krueger |
| 2004/0050590 A1 | 3/2004 | Pirovolou et al. |
| 2009/0055293 A1 | 2/2009 | Mueller et al. |
| 2009/0208295 A1 | 8/2009 | Kinert et al. |
| 2009/0294124 A1 | 12/2009 | Patel |
| 2010/0213942 A1 | 8/2010 | Lazarev |
| 2011/0031023 A1* | 2/2011 | Menezes ................ E21B 7/068 175/61 |
| 2011/0155368 A1 | 6/2011 | El-Khazindar |
| 2012/0075113 A1 | 3/2012 | Loi et al. |
| 2012/0146806 A1 | 6/2012 | Purkis |
| 2012/0205154 A1 | 8/2012 | Lozinsky et al. |
| 2013/0222148 A1 | 8/2013 | Gano et al. |
| 2013/0239673 A1 | 9/2013 | Garcia-Osuna et al. |
| 2013/0319767 A1 | 12/2013 | Wilson et al. |
| 2014/0158351 A1* | 6/2014 | Palmer ................ E21B 47/024 166/255.3 |
| 2014/0367170 A1 | 12/2014 | Hoehn et al. |

* cited by examiner

STEERING ASSEMBLY POSITION SENSING USING RADIO FREQUENCY IDENTIFICATION

BACKGROUND

Every bottom hole assembly (BHA) drilling a deviated borehole rests on the low side of the borehole, thereby experiencing a reactive force that, depending on the geometry, causes the BHA to tend upward (increase borehole inclination due to a fulcrum effect), tend downward (decrease borehole inclination due to a pendular effect), or tend neutral (maintain inclination). Even for a given BHA, the directional tendencies may change due to, e.g., formation effects, bit wear, inclination angle, and parameters that affect stiffness (such as rotational speed, vibration, weight-on-bit, and wash-outs).

Various drillstring mechanisms exist to provide steering and deviation control: mud motors with bent-housings, jetting bits, adjustable gauge stabilizers, and rotary steering systems (RSS). These techniques each employ side force (push-the-bit), bit tilt angle (point-the-bit), or some combination (push-to-point) thereof, to steer the drillstring's forward and rotary motion. However, the reliability and accuracy of such mechanisms face challenges from the extreme temperatures and vibrations associated with the drilling environment. These effects often cause downhole equipment to drift from their calibrated settings, resulting in loss of alignment accuracy. In order to direct the wellbore towards a desired target destination, to control the wellbore horizontally to maintain it within a desired "pay zone," or to correct for unwanted or undesired deviations from a desired or predetermined path, it is continually necessary to adjust the wellbore trajectory while drilling, either to accommodate a planned change in direction or to compensate for unintended or unwanted deflection of the wellbore. Such necessity may cause slow drilling, frequent survey measurements, and in many cases, frequent trips of the drillstring to the surface to repeatedly adjust the steering assembly. Even when such precautions are taken, undesirably undulatory and tortuous wellbores may result, along with the many problems associated therewith.

BRIEF DESCRIPTION OF THE DRAWINGS

Accordingly, there are disclosed herein drillstring steering systems and methods using radio frequency identification (RFID) for position sensing. In the drawings.

Figure 2:
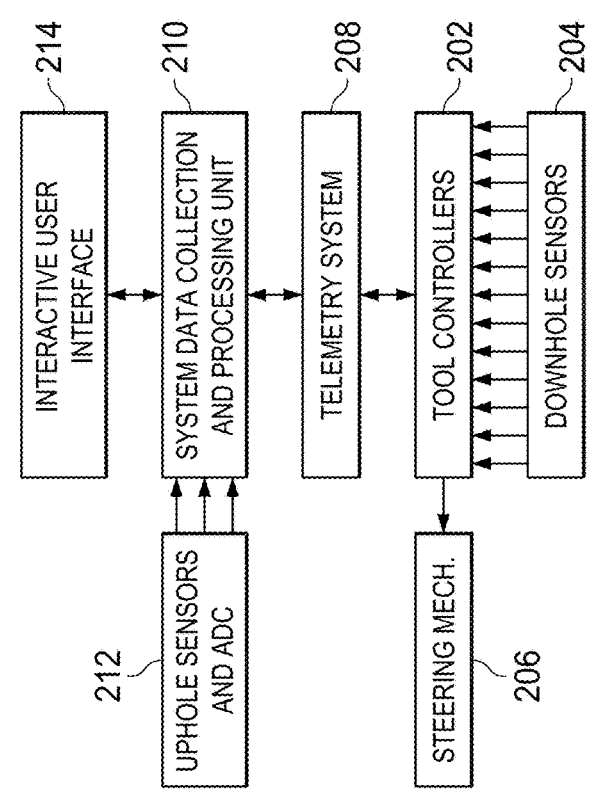
FIG. 2 is a block diagram of an illustrative position sensing system.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Figure 1:
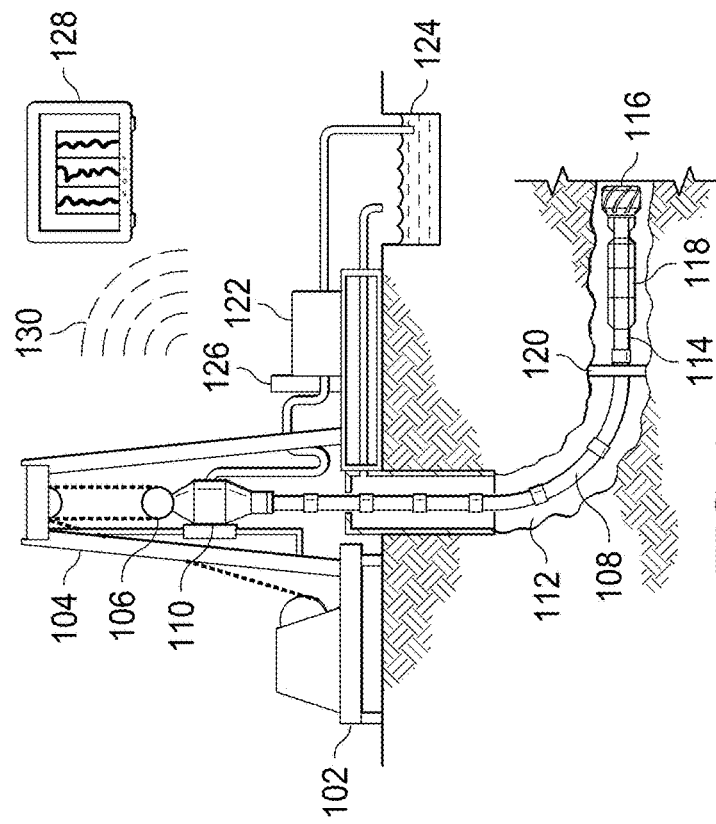
FIG. 1 is a contextual view of an illustrative drilling environment.

An illustrative deviated well drilling environment is shown in FIG. 1. A drilling platform 102 supports a derrick 104 having a traveling block 106 for raising and lowering a steerable drillstring 108. A top drive 110 supports and rotates the drillstring 108 as it is lowered into a borehole 112. The rotating drillstring 108 and/or a downhole motor assembly 114 rotates a drill bit 116. As the drill bit 116 rotates, it extends the borehole 112 in a directed manner through various subsurface formations. The downhole assembly 114 includes steering mechanism. The illustrated steering mechanisms is a rotary steerable system (RSS) 118 which, together with one or more stabilizers 120, enables the drilling crew to steer the borehole along a desired path. A pump 122 circulates drilling fluid through a feed pipe to the top drive 110, downhole through the interior of drillstring 108, through orifices in drill bit 116, back to the surface via the annulus around drillstring 108, and into a retention pit 124. The drilling fluid transports cuttings from the borehole into the retention pit 124 and aids in maintaining the borehole integrity.

The drill bit 116 and downhole motor assembly 114 form just one portion of a bottom-hole assembly (BHA) that includes one or more drill collars (i.e., thick-walled steel pipe) to provide weight and rigidity to aid the drilling process. Some of these drill collars include built-in logging instruments to gather measurements of various drilling parameters such as position, orientation, weight-on-bit, torque, vibration, borehole diameter, downhole temperature and pressure, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. The combination of those two sensor systems enables the measurement of the tool face angle, inclination angle, and compass direction. Such orientation measurements can be combined with gyroscopic or inertial measurements to accurately track tool position.

One or more logging while drilling (LWD) tools may also be integrated into the BHA for measuring parameters of the formations being drilled through. As the drill bit 116 extends the borehole 112 through the subsurface formations, the LWD tools rotate and collect measurements of such parameters as resistivity, density, porosity, acoustic wave speed, radioactivity, neutron or gamma ray attenuation, magnetic resonance decay rates, and indeed any physical parameter for which a measurement tool exists. A downhole controller associates the measurements with time and tool position and orientation to map the time and space dependence of the measurements. The measurements can be stored in internal memory and/or communicated to the surface.

A telemetry sub may be included in the bottom-hole assembly to maintain a communications link with the surface. Mud pulse telemetry is one common telemetry technique for transferring tool measurements to a surface interface 126 and to receive commands from the surface interface, but other telemetry techniques can also be used. Typical telemetry data rates may vary from less than one bit per minute to several bits per second, usually far below the necessary bandwidth to communicate all of the raw measurement data to the surface.

The surface interface 126 is further coupled to various sensors on and around the drilling platform to obtain measurements of drilling parameters from the surface equipment, parameters such as hook load, rate of penetration, torque, and rotations-per-minute (RPM) of the drillstring.

A processing unit, shown in FIG. 1 in the form of a tablet computer 128, communicates with surface interface 126 via a wired or wireless network communications link 130, and provides a graphical user interface (GUI) or other form of interactive interface that enables a user to provide commands and to receive (and optionally interact with) a visual representation of the acquired measurements such as bit and steering element orientation. The measurements may be in log form, e.g., a graph of the borehole trajectory and/or measured parameters as a function of time and/or position along the borehole. The processing unit can take alternative forms, including a desktop computer, a laptop computer, an embedded processor, a cloud computer, a central processing center accessible via the internet, and combinations of the foregoing.

In addition to the uphole and downhole drilling parameters and measured formation parameters, the surface interface 126 or processing unit 128 may be further programmed with additional parameters regarding the drilling process, which may be entered manually or retrieved from a configuration file. Such additional parameters may include, for example, model of the subsurface region, a desired borehole trajectory and limits on deviation from that trajectory. The model and desired trajectory may be based in part on experiences and logs from standoff wells. The additional parameters may further include a control model for steering the drillstring. The control model preferably accounts for deformation of the BHA, and accordingly may incorporate the specifications for the drillstring and BHA, including drilling tubular and collar materials, stabilizer diameters and positions, limits on side forces and dogleg severity, and data structures associating radio frequency identifier tags with steering element, rotatable element, and/or bit orientations.

FIG. 2 is a block diagram of an illustrative drilling system. One or more downhole tool controllers 202 collect measurements from a set of downhole sensors 204, preferably but not necessarily including both drilling parameter sensors and formation parameter sensors, to be digitized and stored, with optional downhole processing to compress the data, improve the signal to noise ratio, and/or to derive parameters of interest from the measurements.

A telemetry system 208 conveys at least some of the measurements or derived parameters to a processing system 210 at the surface, the uphole system 210 collecting, recording, and processing the telemetry information from downhole as well as from a set of sensors 212 on and around the rig. Processing system 210 generates a display on interactive interface 214 of the relevant information, e.g., measurement logs, steering element, rotatable element, and/or bit orientations, borehole trajectory, or extracted values such as directional tendency and recommended drilling parameters to achieve the desired steering. The processing system 210 may further accept user inputs and commands and operate in response to such inputs to, e.g., transmit commands and configuration information via telemetry system 208 to the downhole processor 206. Such commands may alter the settings of the steering mechanism.

Figure 3:
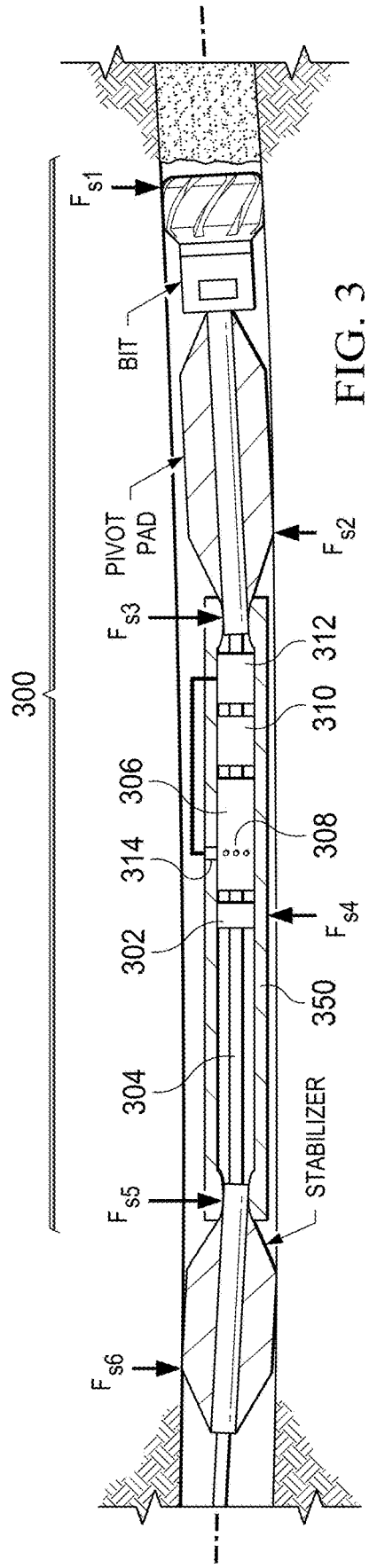
FIG. 3 is a schematic side view of an illustrative steering mechanism.

FIG. 3 shows an illustrative RSS and downhole assembly of the point-the-bit type, which employs a non-rotating housing 350 that introduces an adjustable bend in the drillstring shaft 304, resulting in a controllable bit tilt angle. The assembly also includes a steering element 302, a rotatable element 306 of the tool body, RFID tags 308, an RFID tag reader 314, and an actuation mechanism 310. The steering element 302 may include one or more cams, one or more eccentric rings, or nested eccentric rings to control bit tilt direction and angle in at least one embodiment. As illustrated, the steering element 302 includes a cam to control a bit tilt direction and an eccentricity ring to control a bit tilt angle, but in other embodiments, the steering element 302 may include a push pad to exert a side force against a borehole wall and the like. Periodically, the azimuthal positions of the eccentricity ring and cam may be adjusted to respectively control the amount and direction of bit tilt. As illustrated, the rotatable element 306 of the tool body includes an actuation sleeve, which is a cylindircal member that rotates with the steering element 302. The drillstring shaft 304, nested in steering element 302, may either bend or off-sets accordingly to achieve deflection and azimuthal orientation. The rotatable element 306 includes RFID tags 308 while the housing 350, which does not rotate relative to the rotatable element 306, includes the RFID tag reader 314. In an alternative embodiment, the rotatable element 306 includes the RFID tag reader 314 while the non-rotating housing 350 includes the RFID tags 308. In either case, the RFID tags 308 and the RFID tag reader 314 will pass each other as the actuation mechanism 310 causes the rotatable element 306 to rotate.

In at least one embodiment, the actuation mechanism 310 is a motor. Any type of motor may be used that is capable of providing rotational bias or power to the eccentric rings, including but not limited to hydraulic motors and electric motors. Suitable electric motors include AC motors, brushed DC motors, piezo-electric motors, and electronically commutated motors (ECM). For example, the actuation mechanism 310 may be an electonically commutated motor (ECM), which is powered by application of a varying power signal, controlled by a motor controller, and induces movement between the rotor and the stator of the motor. The ECM does not require brushes or contacts between the rotor and stator, and as such, is well suited for applications that require maintenance-free operation and high rotation speed.

Attached to the housing 350 are a stabilizer and a non-rotating pivot pad. In addition to an internal side force FS4 exerted by the housing on the shaft of the drillstring, the bit, the pivot pad, the housing ends, and the stabilizer each experience respective side forces FS1, FS2, FS3, FS5, and FS6. The balance of these forces further affect the bit tilt angle and introduce some degree of side cutting, which together yield a total walk angle for the BHA.

Operation of the system 300 will be discussed with respect to a specific example for clarity. The steering element 302 positions the drillstring shaft 304, and consequently the drill bit coupled to the drillstring shaft 304, by rotating relative to the housing of a downhole tool. The drillstring shaft 304 is coupled to a rotatable element 306 that turns with the steering element 302. As such, sensing the position of the rotatable element 306 will also sense the position of the steering element 302. In at least one embodiment, the steering element 302 is positioned within the rotatable element 306. The rotatable element 306 includes radio frequency identification (RFID) tags 308 in one plane perpendicular to the axis of rotation of the rotatable element 306. Each RFID tag 308 includes a unique identifier. In at least one embodiment, the RFID tags 308 are circumferentially and evenly distributed on the rotatable element 306. For example, 24 RFID tags 308 may be evenly distributed on the rotatable element 306 such that the distance between two tags 308 represents a 15 degree azimuthal rotation of the rotatable element 306 and the steering element 302. Similarly, any combination of different numbers of tags 308 may represent differing degrees of rotation in various embodiments. For downhole tools including components that move in the direction of the drillstring shaft 304, e.g. slide along the drillstring shaft 304, RFID tags may be placed such that the distance of the movement is measured.

As noted above, the system 300 includes an actuation mechanism 310 that turns the rotatable element 306 and steering element 302, and the system 300 also includes a RFID tag reader 314, or interrogator, that is stationary relative to the rotatable element 306. For example, the RFID tag reader 314 may be located in a housing of the downhole tool. Roberson et al. discusses RFID tag readers and RFID tags in "Methods and Apparatus for Evaluating Downhole Conditions with RFID MEMS Sensors" (U.S. 2014-011149 Pub. Date Apr. 24, 2014). Active tags are powered by an internal battery and may continuously transmit their uniqe idenitification, while passive tags do not require a battery. Rather, passive tags receive power from the RFID reader during interrogation when they transmit their unique identification. Although both can be used in the system 300, passive tags are preferred for their decreased size due to lack of internal batteries.

The reader 314 reads the unique identifiers of the RFID tags 308 as the tags 308 pass the reader 314. The reader 314 may be coupled to one or more processors or control modules 312, which may be coupled to the actuation mechanism 310. The processor 312 receives as input the unique identifiers associated with RFID tags read by the reader 314. Based on a single unique identifier, the processor 312 may determine the azimuthal position of the rotatable element 306 and, hence, the azimuthal position of the steering element 302 and orientation of the bit. The processor may control the adjustment of the azimuthal positioning of the rotatable element 306 and steering element 302 in multiple ways. For example, consider a scenario where a unique RFID tag is read to sense the current position of the steering element 302, and the steering element 302 is desired to be turned 30 degrees from the present position. The processor 312 may send a control signal to the actuation mechanism 310 directing the actuation mechanism 310 to rotate the rotatable element 306 and steering element 302 30 degrees. Alternatively, the processor 312 may send a control signal to the actuation mechanism 310 directing the actuation mechanism 310 to rotate until the actuation mechanism 310 receives a second control signal. Next, the processor 312 may monitor the identifiers received from the RFID tag reader 314 as the rotatable element 306 rotates the RFID tags 308 under the reader 314 until the processor receives an identifier associated with a 30 degree rotation from the original position of the steering element 302. Once received, the processor 312 may send the second control signal to the actuation mechanism 310 causing the actuation mechanism 310 to stop rotating the steering element 302. In at least one embodiment, the actuation mechanism 310 may rotate the rotatable element 306 and/or the steering element 302 in any direction.

If one steering element 302, and one of the position sensing systems 300, is implemented in a downhole tool, the bit orientation adjustment is termed a "fixed bend" adjustment. If more than one steering element 302, and more than one position sensing systems 300, is implemented in the downhole tool, the bit orientation adjustment is termed a "variable bend" adjustment. Both embodiments are considered herein. Although the RFID sensing system has been described using an example of a BHA and drilling tool above for clarity, the RFID sensing system may be used with any downhole tool in order to position the tool or position an element of the tool.

Figure 4:
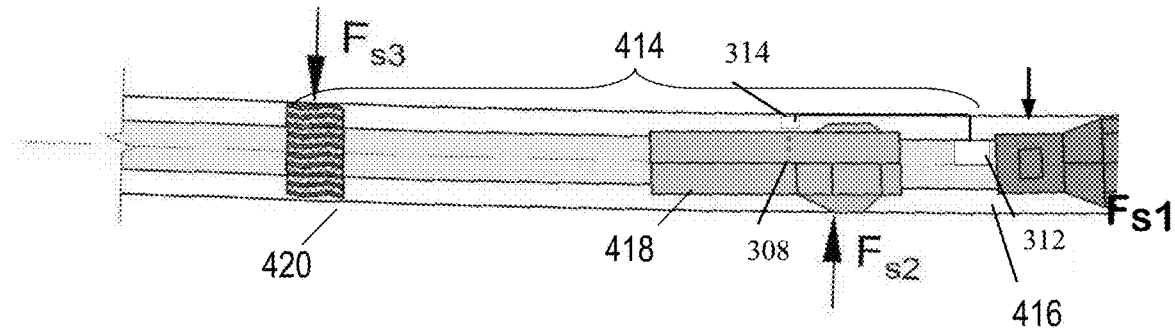
FIG. 4 is a schematic side view of another illustrative steering mechanism.

FIG. 4 shows an illustrative RSS and downhole assembly 414 of the push-the-bit type, which employs a sleeve with a push pad 418 that can press against a selected side of the borehole, acting as an eccentering mechanism that introduces an adjustable eccentricity. The azimuthal position of the sleeve may be adjusted to a desired orientation before the push pad 418 is extended to exert a side force FS2 against the borehole wall using the RFID system 300 described with respect to FIG. 3. As such, the push pad 418 of FIG. 4 may act as the steering element 302 of FIG. 3. Furthermore, RFID tags 308 may be located on the sleeve, and may be read by a RFID tag reader 314 located within a housing of the assembly 414. The RFID tag reader 314 may be coupled to a processor 312 that monitors the azimuthal position of the sleeve based on signals from the RFID tag reader 314. The bit 416 and the stabilizer 420 experience reactive side forces FS1 and FS3. The balance of forces on the BHA introduce some degree of side-cutting by the bit and some degree of bit tilt, which combine to yield a total walk angle for the BHA. Periodically, the drilling may be halted to permit the push force and sleeve position to be adjusted. As explained above, this adjustment may be facilitated through use of the RFID tags 308, RFID tag reader 314, and processor 312 to rotate the sleeve a fixed number of degrees or until a stop signal is received.

Figure 5:
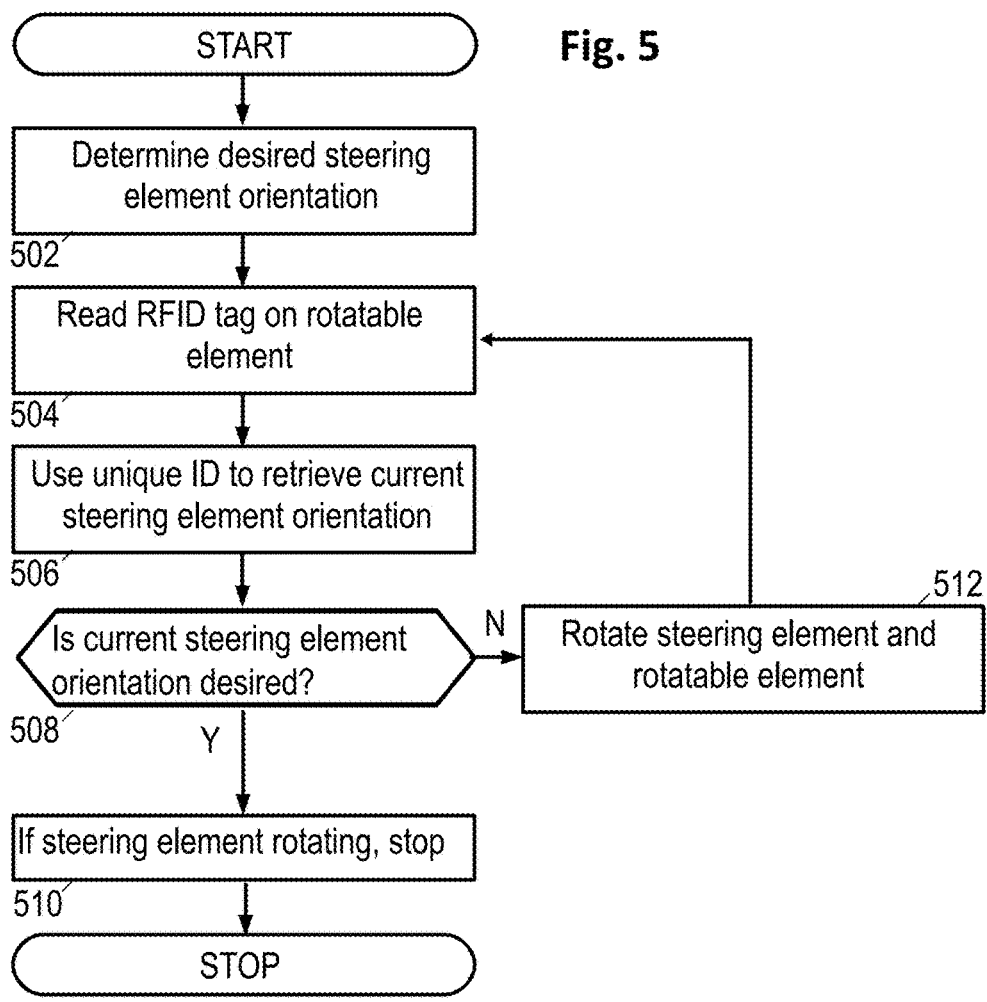
FIG. 5 is a flow diagram of an illustrative position sensing method.

FIG. 5 is a flow diagram of an illustrative method for position sensing in a downhole tool using RFID. The downhole tool may include a rotary steerable system (RSS) in at least one embodiment. The method may be implemented in the form of software stored on a non-transitory information storage medium and loaded into fast memory or cache for execution by a processor, with user input accepted via a user interface and results provided to the user via the user interface. The information storage, memory, processor, and user interface may be all included in a single computer (e.g., tablet computer 128 of FIG. 1) or various computers and components may be networked together to perform the method in a distributed fashion.

At 502, a desired steering element orientation is determined. For clarity, a fixed bend example is considered. However, the method may also be applied to a variable bend system. The desired steering element orientation may be a function of the desired orientation of the bit that is coupled to the steering element. In at least one embodiment, the desired steering element or bit orientation is supplied by a human operator. In an alternative embodiment, the desired steering element or bit orientation is provided automatically, i.e. without human input, from a steering control mechanism.

At 504, a RFID tag, on the rotatable element that rotates with the steering element, is read by a RFID reader. A plurality of RFID tags are distributed circumferentially on the rotatable element to define azimuthal orientation of the steering element. Each RFID tag includes a unique identifier that is provided when read by a RFID reader.

At 506, the unique identifier provided by the RFID tag is used to retrieve the current azimuthal steering element orientation. For example, the unique identifiers and steering element orientation may be associated in a data structure accessible to a processor. In at least one embodiment, the data structure may be a table.

At 508, if the current steering element orientation is not equal to the desired steering element orientation, the steering element and rotatable element are rotated at 512. Accordingly, the bit is re-oriented as well. Next, a second RFID tag is read at 504. The second steering element orientation is determined from the second unique identifier provided by the second RFID tag. At 508, if the current steering element orientation is equal to the desired steering element orientation, then the steering element rotation ceases at 510. By orienting the steering element in the desired steering element orientation, the bit is correctly oriented as well. Accordingly, the bit may be steered as necessary by rotating the steering elements using the RFID tags resulting in faster drilling, less frequent survey measurements, less trips of the drillstring to the surface to adjust the steering assembly, and smooth and straight wellbores. Additionally, the position sensing systems and methods using RFID disclosed herein reduce complexity of orienting the bit by reducing the complexity of the system circuitry and lowering computational times, all while increasing the number of possible orientations of the steering element, rotatable element, and bit.

A downhole steering assembly includes a steering element having an adjustable azimuthal orientation relative to a tool body. The downhole tool further includes a radio frequency identification (RFID) reader to read RFID tags arranged in an azimuthal arrangement. The downhole tool further includes an actuation mechanism that brings different RFID tags into range of the RFID reader. The downhole tool further includes a processor coupled to the RFID reader to determine an azimuthal orientation of the steering element and to responsively control the actuation mechanism.

The steering element may include one or more cams, one or more eccentric rings, or nested eccentric rings to control bit tilt direction and angle in at least one embodiment. The downhole tool may include a processor that receives as input a unique identifier associated with a RFID tag and outputs a signal based on the unique identifier. The downhole tool may further include an actuator that rotates the steering element based on the signal received from the processor. The actuator may rotate the steering element a fixed number of degrees based on the signal. The actuator may rotate the steering element until a second signal is received from the processor, the second signal based on second unique identifier associated with a second RFID tag. The RFID tags may be located on one plane of the rotatable element, the one plane perpendicular to an axis of rotation of the rotatable element. The RFID tags may be distributed circumferentially on the rotatable element to define azimuthal orientation of the steering element. The downhole tool may be a rotary steerable system.

A system for orienting a bit includes an earth drilling bit and a rotatable steering element, coupled to the bit, that orients the bit. The system may include an rotatable element that rotates with the steering element, the rotatable element including radio frequency identification (RFID) tags distributed on the rotatable element to define orientation of the steering element. The system may include a housing stationary relative to the rotatable element, the housing including a RFID reader that reads the RFID tags, each RFID tag associated with a unique azimuthal position of the steering element relative to the RFID reader.

The system may further include a processor that receives as input a unique identifier associated with a RFID tag and outputs a signal based on the unique identifier. The system may further include an actuator that rotates the steering element based on the signal received from the processor. The actuator may rotate the steering element a fixed number of degrees based on the signal. The actuator may rotate the steering element until a second signal is received from the processor, the second signal based on second unique identifier associated with a second RFID tag. The RFID tags may be located on one plane of the rotatable element, the one plane perpendicular to an axis of rotation of the rotatable element. The RFID tags may be distributed circumferentially on the rotatable element to define azimuthal orientation of the steering element. A rotary steerable system, including the housing, may be used to steer the bit.

A method for orienting a bit of a downhole tool includes reading a RFID tag on an rotatable element that rotates with a steering element, the steering element coupled to the bit. The method includes determining a first azimuthal orientation of the steering element based on a unique identifier associated with the RFID tag. The method further includes rotating the steering element from the first azimuthal orientation to a second azimuthal orientation, the rotating steering element causing the bit to move from a first bit orientation to a second bit orientation.

Determining the first azimuthal orientation may include retrieving the first azimuthal orientation from a data structure associating the first azimuthal orientation with the unique identifier. Rotating the steering element may include rotating the steering element a fixed number of degrees. Rotating the steering element may include rotating the steering element until a second unique identifier is read, indicating the bit is the second orientation. A plurality of RFID tags may be distributed circumferentially on the rotatable element to define azimuthal orientation of the steering element. The method may further include steering the bit by rotating the steering elements using a plurality of RFID tags.

While the present disclosure has been described with respect to a limited number of embodiments, those skilled in the art will appreciate numerous modifications and variations therefrom. It is intended that the appended claims cover all such modifications and variations.

What is claimed is:

1. A downhole steering assembly comprising:
    a steering element having an adjustable azimuthal orientation relative to a tool body;
    a radio frequency identification (RFID) reader on one of said steering element and said tool body to read RFID tags arranged in an azimuthal arrangement on the other of said steering element and said tool body;
    an actuation mechanism that adjusts said azimuthal orientation, thereby bringing different RFID tags from the azimuthal arrangement into range of the RFID reader; and
    a processor coupled to the RFID reader to determine an azimuthal orientation of the steering element and to responsively control the actuation mechanism.

2. The steering assembly of claim 1, wherein the steering element is push pad to exert a side force against a borehole wall.

3. The steering assembly of claim 1, wherein the steering element is a cam to control a bit tilt direction.

4. The steering assembly of claim 1, wherein the steering element is an eccentricity ring to control a bit tilt angle.

5. The steering assembly of claim 1, wherein the processor receives as input a unique identifier associated with a RFID tag and outputs a signal based on the unique identifier, and wherein the actuation mechanism rotates the steering element based on the signal received from the processor.

6. The steering assembly of claim 5, wherein the actuation mechanism rotates a fixed number of degrees based on the signal.

7. The steering assembly of claim 5, wherein the actuation mechanism rotates until a second signal is received from the processor, the second signal based on second unique identifier associated with a second RFID tag.

8. The steering assembly of claim 1, wherein the RFID tags are located on one plane perpendicular to an axis of rotation of the actuation mechanism.

9. A method for orienting a bit of a downhole tool, comprising:
reading a RFID tag on one of a steering element and a downhole tool body, the tool coupled to the bit;
determining a first azimuthal orientation of the steering element based on a unique identifier associated with the RFID tag;
rotating the steering element from the first azimuthal orientation to a second azimuthal orientation, the rotating steering element causing the bit to move from a first bit orientation to a second bit orientation.

10. The method of claim 9, wherein determining the first azimuthal orientation comprises retrieving the first azimuthal orientation from a data structure associating the first azimuthal orientation with the unique identifier.

11. The method of claim 9, wherein rotating the steering element comprises rotating the steering element a fixed number of degrees.

12. The method of claim 9, wherein rotating the steering element comprises rotating the steering element until a second unique identifier is read indicating the bit is the second orientation.

13. The method of claim 9, wherein a plurality of RFID tags are distributed circumferentially on one of the steering element and the downhole tool body.

14. The method of claim 9, further comprising steering the bit by rotating the steering element using a plurality of RFID tags.

15. A system for orienting a bit, comprising:
an earth drilling bit;
a steering element, having an adjustable azimuthal orientation relative to a tool body, coupled to the bit that orients the bit;
a radio frequency identification (RFID) reader on said steering element to read RFID tags arranged in an azimuthal arrangement on said tool body;
an actuation mechanism that adjusts said azimuthal orientation, thereby bringing different RFID tags from the azimuthal arrangement into range of the RFID reader; and
a processor coupled to the RFID reader to determine an azimuthal orientation of the steering element and to responsively control the actuation mechanism.

16. The system of claim 15, wherein the steering element is push pad to exert a side force against a borehole wall.

17. The system of claim 15, wherein the steering element is a cam to control a bit tilt direction.

18. The system of claim 15, wherein the steering element is an eccentricity ring to control a bit tilt angle.

19. The system of claim 15, wherein the processor receives as input a unique identifier associated with a RFID tag and outputs a signal based on the unique identifier, and wherein the actuation mechanism rotates the steering element based on the signal received from the processor.

20. The system of claim 15, wherein the RFID tags are located on one plane perpendicular to an axis of rotation of the actuation mechanism.

* * * * *